United States Patent
Oh

(10) Patent No.: US 10,256,709 B2
(45) Date of Patent: Apr. 9, 2019

(54) LINEAR VIBRATOR

(71) Applicant: MOATECH CO., LTD, Incheon (KR)

(72) Inventor: Seong-Kwan Oh, Incheon (KR)

(73) Assignee: MOATECH CO., LTD, Incheon (KR)

(*) Notice: Subject to any disclaimer, the term of this patent is extended or adjusted under 35 U.S.C. 154(b) by 430 days.

(21) Appl. No.: 15/001,863

(22) Filed: Jan. 20, 2016

(65) Prior Publication Data

US 2016/0218607 A1    Jul. 28, 2016

(30) Foreign Application Priority Data

Jan. 22, 2015    (KR) .................. 10-2015-0010373

(51) Int. Cl.
*H02K 33/16*   (2006.01)
*B06B 1/04*    (2006.01)

(52) U.S. Cl.
CPC ............ *H02K 33/16* (2013.01); *B06B 1/045* (2013.01)

(58) Field of Classification Search
CPC .................... H02K 33/00–33/18; B06B 1/045
See application file for complete search history.

(56) References Cited

U.S. PATENT DOCUMENTS

2014/0202252 A1*   7/2014   Umehara .............. G01M 7/027
                                                        73/664

* cited by examiner

*Primary Examiner* — Ramon M Barrera
(74) *Attorney, Agent, or Firm* — John K. Park; Park Law Firm

(57) ABSTRACT

A linear vibrator that transmits tactile signals to a user of a mobile phone, PDA, or a portable game console. The linear vibrator uses rubber or silicone rubber having lower elasticity as a material of an elastic body secured to a casing or a base for supporting an oscillator horizontally moving by an electromagnetic force relative to a facing stator, thereby lowering the frequency sensitivity due to a characteristic frequency; reducing various errors of parts and errors in part assembly, thus resulting in smaller deviations of characteristic frequencies between products from mass production; and significantly reducing production cost by using an elastic body made of rubber or silicon rubber instead of steel plate or wire, thereby efficiently producing a structure through a simple assembly process and reducing the manufacture facility cost and labor cost resulting in improved productivity.

7 Claims, 7 Drawing Sheets

LINEAR VIBRATOR

BACKGROUND OF THE INVENTION

Field of the Invention

The present invention generally relates to a linear vibrator for transmitting tactile signals to a user of a mobile phone, PDA, or a portable game console. More particularly, the present invention relates to a linear vibrator using rubber or silicone rubber having lower elasticity as a material of an elastic body secured to a casing or a base for supporting an oscillator horizontally moving by an electromagnetic force relative to a facing stator, thereby lowering the frequency sensitivity due to a characteristic frequency; reducing various errors of parts and errors in part assembly, thus resulting in smaller deviations of characteristic frequencies between products from mass production; and significantly reducing production cost by using an elastic body made of rubber or silicon rubber instead of steel plate or wire, thereby efficiently producing a structure through a simple assembly process and reducing the manufacture facility cost and labor cost resulting in improved productivity.

Description of the Related Art

For transmitting tactile signals to a user of a mobile phone, PDA, or a portable game console by generating vibration, a rotating device using an eccentric mass has conventionally been used. More recently, a linear vibrator has been developed for maximizing the vibrating intensity by making the exciting frequency coincide with the characteristic frequency of a structure.

Recently developed linear vibration generators or linear vibrators with thin structures, which provide horizontal vibrations of high intensities, have been proposed, for example, through Korean Patent Applications No. 10-2010-0090230, 10-2011-0008308, 10-2011-0019823, 10-2012-0124255, and 10-2013-0089911 filed by the same applicant as the present invention.

Such linear vibrators conventionally comprise an oscillator having a weight installed inside of a casing, and an elastic metal body formed in a U-shaped structure surrounding the weight, one end of which is connected to the weight and the other end of which is secured to the casing. Such a vibrator generates horizontal vibration by use of a resonance formed by applying an electromagnetic force of exiting frequency at the same frequency as the characteristic frequency of the elastic body, in which the vibration is maximized when the excited frequency of the electromagnetic force coincides with the characteristic frequency of the elastic body.

The elastic body, however, comprises a leaf spring formed of a steel plate or a coil spring formed of a steel wire, and the characteristic frequency may be easily changed by a trivial difference such as an insignificant shape difference between products, so that it is difficult to make the exciting frequency coincide with an intended characteristic frequency, This makes the mass production of elastic bodies having constant features such as a constant characteristic frequency, difficult and thus requires high production cost.

The description provided above as a related art of the present invention is only for helping understanding the background of the present invention and should not be construed as being included in the related art known by those skilled in the art.

DOCUMENTS OF RELATED ART (Patent Document 1) Korean Patent Application No. 10-2010-0090230;

(Patent Document 2) Korean Patent Application No. 10-2011-0008308;

(Patent Document 3) Korean Patent Application No. 10-2011-0019823;

(Patent Document 4) Korean Patent Application No. 10-2012-0124255;

(Patent Document 5) Korean Patent Application No. 10-2013-0089911;

SUMMARY OF THE INVENTION

Accordingly, the present invention has been made to resolve the above problems occurring in the prior arts, and the present invention is intended to propose a linear vibrator for transmitting tactile signals to a user of a mobile phone, PDA, or a portable game console by generating vibration, the linear vibrator including: a casing having a predetermined inner cavity; a stator installed in the casing and having a coil for conducting an electric current; and an oscillator installed in the casing and horizontally moving against the stator by an electromagnetic force, in which an elastic body secured to the casing or a base for supporting the oscillator is formed of rubber or silicone rubber having relatively low elasticity to lower the frequency sensitivity due to a characteristic frequency, and to reduce various errors of parts and errors of part assembly, thus reducing the deviation of the characteristic frequency of products of mass production to significantly lower the production cost, and also reducing the manufacture facility cost and labor cost and improving the productivity by completing a structure through a simple assembly process as the elastic body is formed of rubber or silicone rubber instead of conventional steel plate or wire. In order to achieve the above object, according to one aspect of the present invention, there is provided a linear vibrator including: a casing having a predetermined inner cavity; a stator installed in the casing and having a coil for conducting current; an oscillator installed in the casing and horizontally moving against the stator by an electromagnetic force; a base for closing an open side of the base; and an elastic body secured to the casing or the base for supporting the oscillator, wherein the elastic body is formed of rubber or silicone rubber.

The oscillator may include a magnet and a magnetic plate for attaching the magnet, and the elastic body may be integrally formed with the magnetic plate at opposite side of the magnetic plate.

The elastic body may be formed in two pieces having same appearances and respectively disposed at opposite side of a magnetic plate, each of the elastic bodies including: an extension part extending to a direction perpendicular to a moving direction of the oscillator, and a protrusion part protruding vertically at each of opposite ends of the extension part, with an assembly part provided on the protrusion part so as to secure the elastic body to the casing or the base.

In the linear vibrator, standing portions may be respectively formed at opposite sides of the magnetic plate by being bent for being securely connected to the elastic body.

The extension part of the elastic body may be flexible so as to elongate for being securely coupled to the casing or the base.

The oscillator may further include a weight.

In the linear vibrator, a plurality of posts may protrude upwardly at one side of the casing or the base, and each of the posts may be inserted into an associated assembly part formed in the elastic body to secure the elastic body to the casing or the base.

In the linear vibrator, a nonmagnetic uneven part may be provided on a part of one side of the base, and the coil may be installed on the nonmagnetic uneven part.

The assembly part may include a plurality of coupling apertures, each of which has a circular or polygonal section, and receives an associated post protruding from the casing or the base.

The elastic body may have a flexible structure for being secured to the casing or the base, and each of the standing portions of the magnetic plate may have a surface not to be in contact with the elastic body when the elastic body elongates for being coupled to the casing or the base.

The linear vibrator according to the present invention uses rubber or silicone rubber having lower elasticity as a material of an elastic body secured to a casing or a base for supporting an oscillator horizontally moving by an electromagnetic force relative to a facing stator, thereby lowering the frequency sensitivity due to a characteristic frequency compared to a conventional elastic body formed of steel plate or wire, and reducing various errors of parts and part assembly, thus resulting in smaller deviations of inherent frequencies between products from mass production and significantly reducing production cost.

In addition, the present invention uses an elastic body formed of rubber or silicone rubber instead of a conventional steel plate or wire, enabling assembly of a structure through a simple process, thereby reducing manufacture facility cost and labor cost, and thus improving productivity.

Furthermore, the present invention includes a nonmagnetic uneven part provided on a part of one side of the base, whereon a coil can be mounted, thereby preventing a reduction in the vibration intensity that may be caused by magnetic interference between the oscillator and the base even when the base is formed of a magnetic material, and preventing a reduction in the vibration intensity that may be caused by a magnetic leakage through the base even when the base is formed of a nonmagnetic material.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
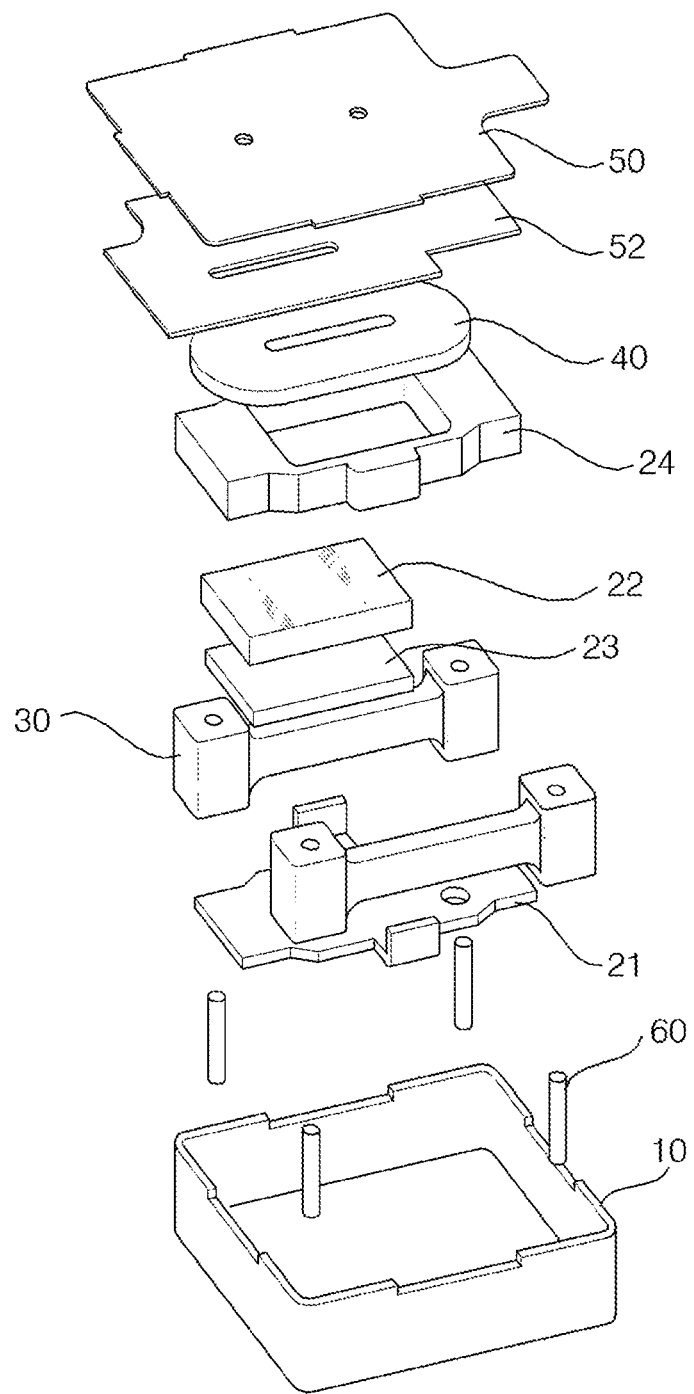
FIG. 1 is an exploded perspective view of a linear vibrator according to an embodiment of the present invention.
Figure 2:
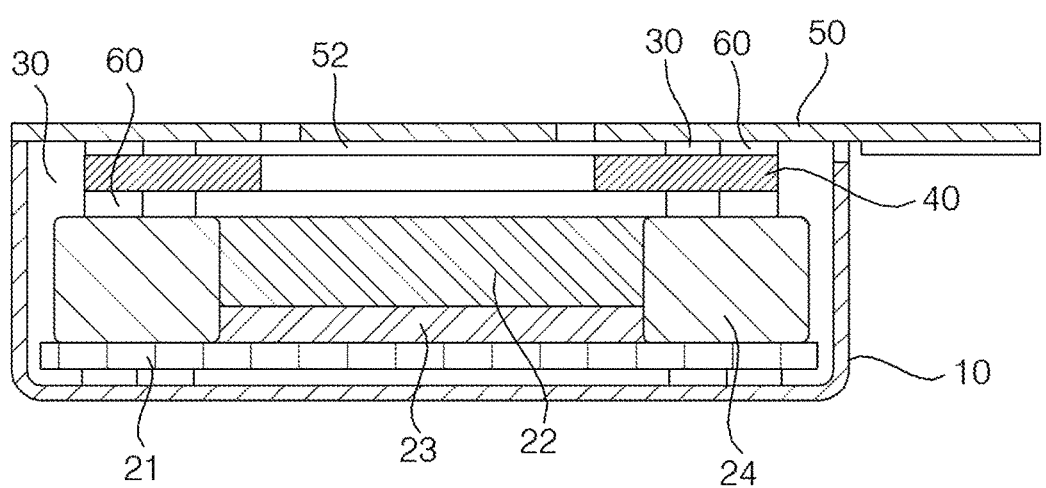
FIG. 2 is a sectional view of the linear vibrator according to the present invention in a state of being completely assembled.
Figure 3:
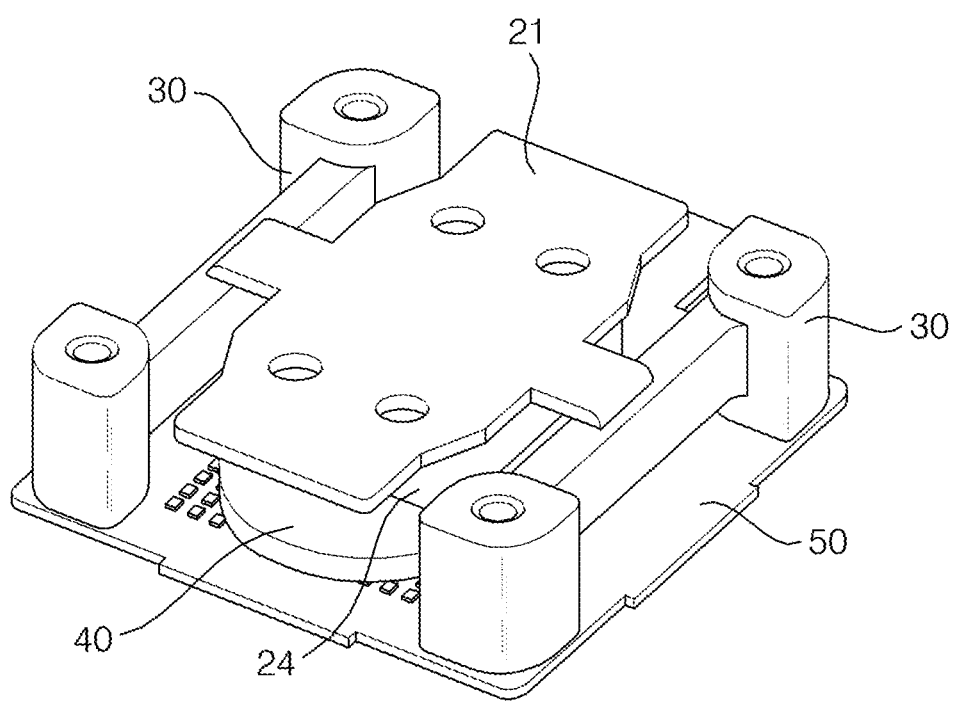
FIG. 3 is a perspective view of the linear vibrator according to the present invention with a casing being removed for convenience of illustration.

Hereinbelow, exemplary embodiments of the present invention will be described in detail with reference to the accompanying drawings. Throughout the drawings, the same reference numerals will refer to the same or like parts.

As shown in FIGS. 1 to 4, a linear vibrator according to the present invention for transmitting tactile signals to a user of a mobile phone, PDA, or a portable game console by generating vibration, includes a casing 10 having a predetermined inner cavity, a stator installed in the casing 10 and having a coil 40 for conducting an electric current, an oscillator 20 installed in the casing 10 and horizontally moving against the stator by the electromagnetic force, and a base 50 for closing an open side of the casing 10, in which an elastic body 30 secured to the casing 10 or a base 50 for supporting the oscillator 20 is formed of rubber or silicone rubber having relatively lower elasticity compared to an elastic body formed of metal.

The stator includes the coil 40 to which the electric signal is introduced from exterior, and a FPC (Flexible Printed Circuit) 52, on which the circuit pattern is mounted, being placed under the coil 40 and on the upper surface of the base. The coil 40 has an internal cavity, and a core (not shown) may be installed in the cavity or be omitted.

The oscillator 20 faces the coil 40 with a predetermined gap, and horizontally moves by the electromagnetic force generated by interaction with the coil 40 to which the electric signal is induced from exterior, and includes a magnet 22 directly interacting with the coil 40 and a magnetic plate 21 attached to the bottom of the magnet 22 by the magnetic force. A weight 24 can be added to the magnet 22 and the magnetic plate 21 to enhance the vibration amplitude. The magnet 22 can be constructed in two pieces, and the magnet piece adjacent to the magnetic plate 21 can be replaced by a back yoke 23 formed of magnetic material. Further, the weight 24 can be formed with a through aperture, and the back yoke 23 can be inserted into the through aperture when the back yoke 23 is installed.

The elastic body 30 can preferably be formed by two pieces, each of which has same appearance, and is respectively disposed at either side of the magnetic plate and secured thereat. For this purpose, the elastic body can be formed by injection molding or press molding to integrally be fabricated with the magnetic plate 21.

Figure 4:
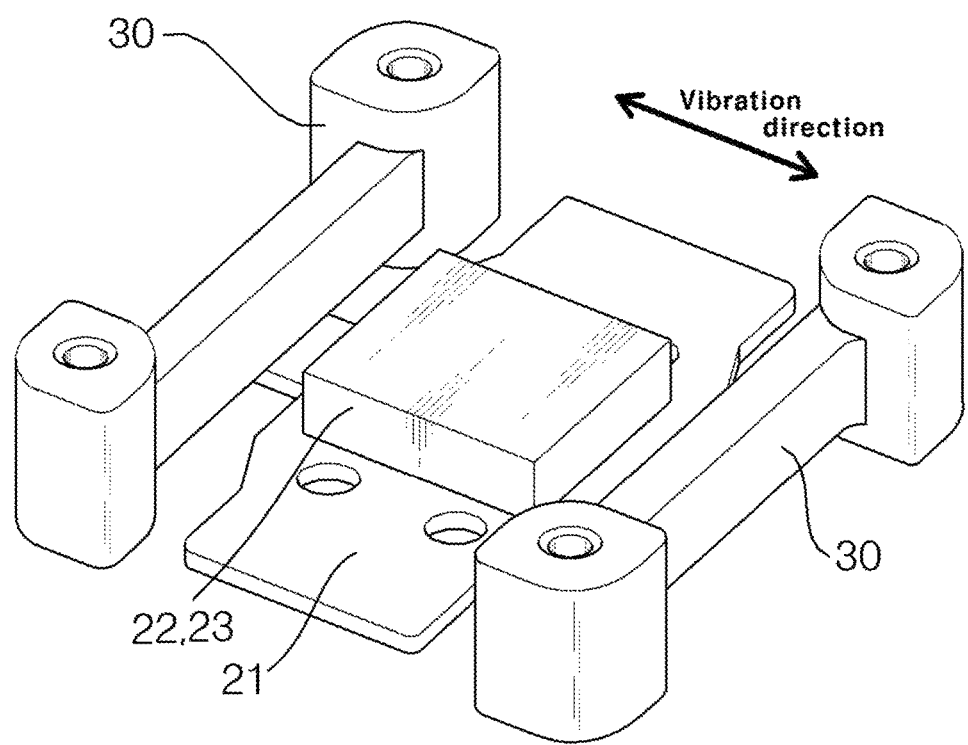
FIG. 4 is a perspective view of the linear vibrator according to the present invention with a casing and a base being removed for convenience of illustration.
Figure 5A:
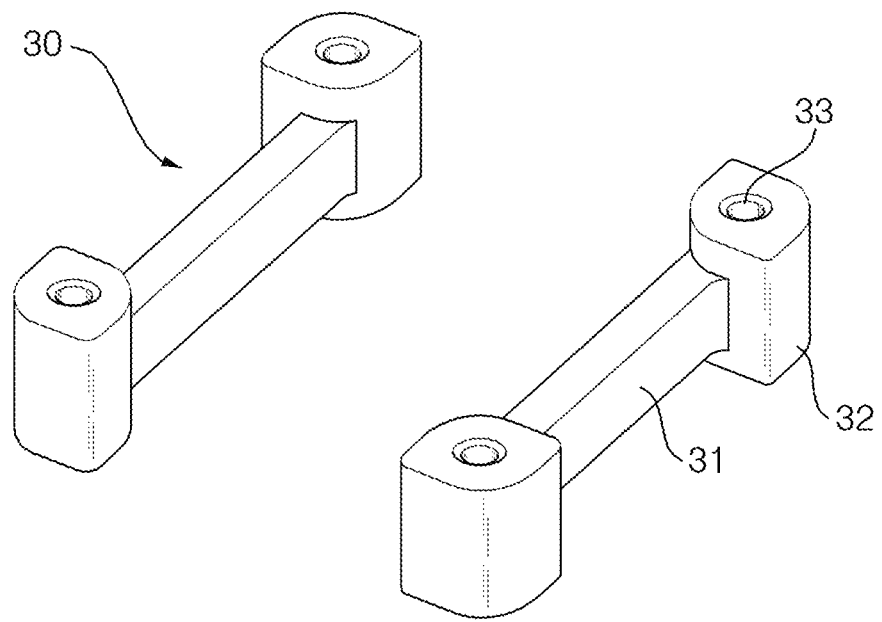
FIGS. 5a and 5b are perspective views showing an elastic body and a magnetic plate of the linear vibrator according to the present invention, respectively.
Figure 5B:
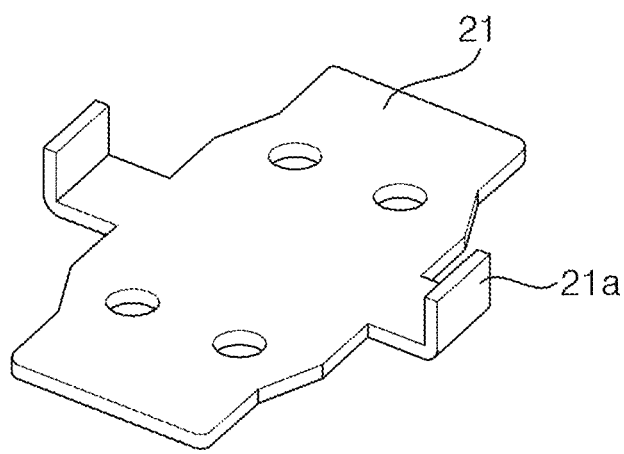

As shown in FIGS. 4 and 5a, the elastic body 30 includes an extension part 32 extending perpendicular to a moving direction of the oscillator 20, and two protrusion parts 32, each of which vertically protrudes from opposite ends of the extension part 31. At the protrusion part 32, an assembly part 33 having a coupling aperture for securely receiving the post 60 of the circuit board P, is provided.

The elastic body requires a subsequent heat treatment, the treatment condition, for example, is maintaining the body in a high temperature oven of 100° C.~200° C. for one hour or more.

At a predetermined portion (about the middle portion) of the extension part 31 of the elastic body 30, there is provided a coupling part 31a, shaped as a recess, and two standing portions 21a that are upwardly bent at opposite sides of magnetic plate, and the elastic body 30 is securely coupled to the magnetic plate 21 by inserting the standing portions 21a into the respective coupling parts 31a.

Moreover, the extension part 31 of the elastic body 30 is preferably flexible so as to elongate for being securely coupled to the casing 10 or the base 50.

By using rubber or silicone rubber having relatively low elasticity as a material of the elastic body 30, the frequency sensitivity due to the characteristic frequency of the oscillator can be lowered when compared to a conventional elastic body formed of steel plate or wire, so that various errors of parts and errors of part assembly in mass production can be reduced, and production cost can be significantly reduced.

Figures 6A, 6B:
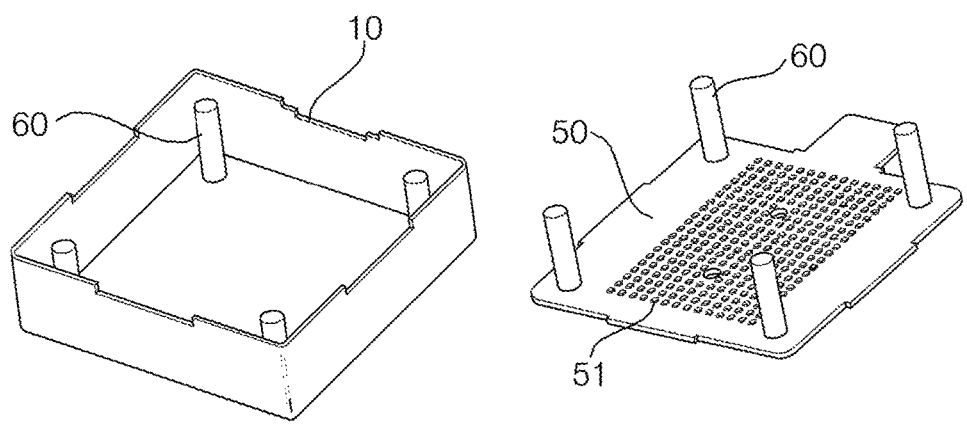
FIG. 6a is a perspective view showing posts provided on the casing according to one embodiment of the present invention.
FIG. 6b is a perspective view showing posts provided on the base according to another embodiment of the present invention.

The post 60 for being securely inserted into the assembly part 33 of the elastic body 30, may upwardly protrude from the bottom plate of the casing 10 by multiple numbers (four as drawn) to couple the elastic body 30 to the casing 10 as shown in FIG. 6a. Alternately, the post 60 may upwardly protrude from the upper plate of the base 50 by multiple numbers (four as drawn) to couple the elastic body 30 to the casing 50 as shown in FIG. 6b. And the post 60 may be mounted separately to both of the casing 10 and the base 50.

The assembly part 33 of the elastic body 30 has the coupling aperture for receiving the post 60 of the casing 10 or the base 50, and the coupling aperture may have a circular or polygonal section.

Figure 7:
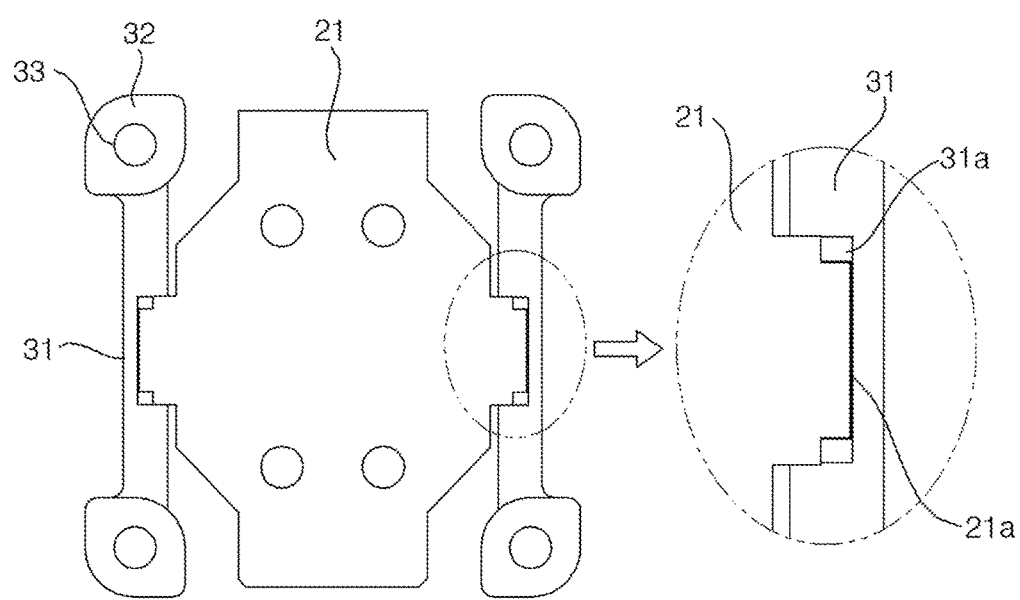
FIG. 7 is a plan view of the linear vibrator according to the present invention, in which respective elastic bodies are provided on opposite sides of the magnetic plate.

The elastic body 30 may have a flexible structure for being secured to the casing 10 or the base 50, and each of the standing portions 21a of the magnetic plate 21 has a surface not touching the coupling part 31a formed on the extension part 31 of the elastic body 30, thereby being free from interfering with the elongation of the extension part 31 when the post 60 of the casing 10 or the base 50 is inserted into the elastic body 30, as shown in FIG. 7.

To make the side of the standing portion 21a of the magnetic plate 21 have a surface not in contact with the coupling portion 31a of the elastic body 30, the extension part 31 can be pulled to separate the bond joint after securing the magnetic plate 21.

Now, the vibrating process of the linear vibrator according to the present invention will be described.

After the magnetic plate 21 and the magnet 22 are supported in the casing 10 by the extension part 31 of the elastic body 30, and the plurality of posts 60 vertically protruding from the casing 10 or the base 50 is inserted into the assembly part 33, then the magnet 22 is movably stored in the casing 10 with a predetermined gap.

When the exterior electric signal is alternately applied to the coil 40 facing the magnet at a predetermined gap, the magnet 22 is induced to move from side by side by the interaction between the magnet 22 and the coil 40, and the magnetic plate 21 securely attached to the magnet 22 is also induced to move.

Under the circumstances, as the elastic body 30 secured to the magnetic plate 21 and movably supported by the post 60, the elastic body 30 horizontally moves with the alternating repetition of elongations and retractions.

Desirable vibration, therefore, can be obtained by adjusting the amount and application time of an electric current applied to the coil 40.

To enhance the amplitude of the vibration, a weight 24 may be added to a part of the magnet 22 and the magnetic plate 21 to increase the vibration mass.

A nonmagnetic uneven part 51 is provided on a part of one surface of the base 50, and the coil 40 is securely mounted on the uneven part 51. This prevents a reduction in the vibration intensity that may be caused by magnetic interference between the oscillator 20 and the base 50 even when the base 50 is formed of a magnetic material, and prevents a reduction in the vibration intensity that may be caused by magnetic leakage through the base 50 even when the base 50 is formed of a nonmagnetic material.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A linear vibrator comprising:
a casing having a predetermined inner cavity;
a stator installed in the casing and having a coil for conducting current;
an oscillator installed in the casing and moving against the stator by an electromagnetic force;
a base for closing an open side of the casing; and
an elastic body for supporting the oscillator,
wherein the elastic body is formed of rubber or silicone rubber,
wherein the oscillator includes a magnet and a magnetic plate for attaching the magnet, and the elastic body is integrally formed with the magnetic plate at opposite sides of the magnetic plate,
wherein standing portions are respectively formed at opposite sides of the magnetic plate by being bent for being securely connected to the elastic body, and
wherein each of the standing portions has a surface not to be in contact with a respective coupling part formed on an extension part of the elastic body.

2. The linear vibrator according to claim 1, wherein the elastic body is formed in two pieces having same appearances and respectively disposed at opposite sides of the magnetic plate, each of the elastic bodies including: the extension part extending to a direction perpendicular to a moving direction of the oscillator, and a protrusion part protruding vertically at each of opposite ends of the extension part, with an assembly part provided on the protrusion part.

3. The linear vibrator according to claim 2, wherein the extension part of the elastic body is flexible so as to elongate.

4. The linear vibrator according to claim 3, wherein a plurality of posts protrude upwardly at one side of the casing, and each of the posts is inserted into an associated assembly part formed in the elastic body to secure the elastic body to the casing.

5. The linear vibrator according to claim 1, wherein the oscillator further includes a weight.

6. The linear vibrator according to claim 1, wherein a nonmagnetic uneven part is provided on a part of one side of the base, and the coil is installed on the nonmagnetic uneven part.

7. The linear vibrator according to claim 1, wherein the oscillator further includes a weight.

* * * * *